(12) United States Patent
Yamaguchi et al.

(10) Patent No.: US 7,486,045 B2
(45) Date of Patent: Feb. 3, 2009

(54) BATTERY PACK, ELECTRICAL DEVICE CONNECTABLE TO BATTERY PACK, AND METHOD OF IDENTIFYING BATTERY PACK TYPE

(75) Inventors: Masao Yamaguchi, Sumoto (JP); Atsushi Sakai, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 304 days.

(21) Appl. No.: 10/934,353

(22) Filed: Sep. 7, 2004

(65) Prior Publication Data

US 2005/0057216 A1 Mar. 17, 2005

(30) Foreign Application Priority Data

Sep. 12, 2003 (JP) .............................. 2003-321149

(51) Int. Cl.
*H02J 7/00* (2006.01)
*H02J 7/04* (2006.01)

(52) U.S. Cl. .................. 320/106; 320/107; 320/141

(58) Field of Classification Search ............. 320/106, 320/107, 141, 1; 429/1
See application file for complete search history.

(56) References Cited

U.S. PATENT DOCUMENTS

| | | | | |
|---|---|---|---|---|
| 5,721,933 | A | * | 2/1998 | Walsh et al. ............... 713/300 |
| 6,031,353 | A | * | 2/2000 | Banyas et al. .............. 320/112 |
| 6,175,211 | B1 | | 1/2001 | Brotto |
| 6,211,644 | B1 | | 4/2001 | Wendelrup et al. |
| 6,504,341 | B2 | | 1/2003 | Brotto |

FOREIGN PATENT DOCUMENTS

| | | |
|---|---|---|
| JP | 6-029012 | 2/1994 |
| JP | 9-500520 | 1/1997 |
| JP | 9-146761 | 6/1997 |
| JP | 2000-200222 | 7/2000 |
| JP | 3341302 | 8/2002 |
| JP | 2002-282507 | 10/2002 |
| JP | 2003-162986 | * 6/2003 |
| KR | 2002-0004946 | 1/2002 |
| WO | 95/25375 | 9/1995 |
| WO | 96/10858 | 4/1996 |
| WO | 96/15563 | 5/1996 |
| WO | 00/45495 | 8/2000 |

* cited by examiner

*Primary Examiner*—Akm Enayet Ullah
*Assistant Examiner*—Yalkew Fantu
(74) *Attorney, Agent, or Firm*—Wenderoth, Lind & Ponack, L.L.P.

(57) ABSTRACT

A battery pack has a rechargeable battery, a pair of externally exposed charge/discharge terminals connected to the electrodes of the rechargeable battery, and an externally exposed battery pack signal terminal for identifying the type of the battery pack. The battery pack further has a battery pack communication portion connected to the battery pack signal terminal for receiving an authenticity signal transmitted from an electrical equipment unit through the battery pack signal terminal; a random number generating portion for generating a random number based on a predetermined condition; and a battery pack control portion for generating a detection signal based on the authenticity signal received by the battery pack communication portion and the random number generated by the random number generating portion, and for transmitting the detection signal from the battery pack communication portion to the electrical equipment unit side through the battery pack signal terminal.

14 Claims, 4 Drawing Sheets

CHARGE/DISCHARGE 4 4A 5 4B
TERMINAL

BATTERY PACK, ELECTRICAL DEVICE CONNECTABLE TO BATTERY PACK, AND METHOD OF IDENTIFYING BATTERY PACK TYPE

BACKGROUND OF THE INVENTION

1. Technical Field of the Invention

The present invention relates to a battery pack containing rechargeable batteries, an electrical device connectable to this battery pack, and a method of identifying the type of a battery pack.

2. Description of the Related Art

Battery pack contains rechargeable batteries (secondary batteries), which can be repeatedly recharged, such as nickel-cadmium batteries, nickel-hydrogen batteries, and lithium-ion batteries. Since there are many different types of electrical devices which use battery packs, such as portable electrical equipment, there are also many different types of rechargeable batteries housed in battery packs. In particular, the rated voltage of a rechargeable battery is specified according to the electrical equipment to which the rechargeable battery is connected, and it is necessary to connect a battery pack containing rechargeable batteries suitable for the type of electrical equipment. Consequently, a battery pack provided with a signal terminal, which allows the electrical equipment to identify the type of battery pack connected, has been developed.

Battery pack is designed to properly provide power to electrical equipment connected to the battery pack under specified conditions. Some battery packs have protection circuits such as over-charge, or over-discharge prevention circuits to protect the battery packs and the main units of electrical equipment. However, in some cases, compatible battery packs such as so-called pirated articles do not have such protection circuits. In these cases, occurrence of voltage variation may cause not only improper operation of electrical equipment units but also damage of the electrical equipment units or the battery packs themselves. Accordingly, in order to protect an electrical equipment unit by detecting use of such a false battery pack, it is necessary to identify whether a battery is authorized.

There are a battery pack and an electrical equipment unit using this battery pack both of which have signal terminals for communication additionally to positive and negative electrode terminals for charging/discharging. The signal terminals are used for identification of an authorized battery. FIG. 1 shows an example of a battery pack and an electrical equipment unit serving to perform the identification of an authorized battery. With the electrical equipment unit 501 and battery pack 502 shown in this figure, certain information is transmitted from the electrical equipment unit 501 to the battery pack 502 through signal terminals. Then, the battery pack 502 inputs the information received from the signal terminal in a predetermined function, and returns the result to the electrical equipment unit 501. Subsequently, an electrical equipment unit 501 compares the transmitted information and the returned result, and detects whether the result is obtained by the predetermined function or not by means of an electrical equipment control portion 515. When the result of detection is correct, the battery pack 502 is identified as an authorized battery, when the result is not correct or is not returned the battery pack 502 is identified as a false battery, and a display portion 516 displays the result of the identification.

However, there is a problem that the above identification method cannot sufficiently eliminate false battery packs. The reason is that false battery packs can have signal terminals and the function can be set in the signal terminals. For example, if a manufacturer of a false battery pack monitors communication data in the signal terminal by using an authorized battery pack and can guess the relation between an input value and an output value, the manufacturer can install a mechanism calculating similarly in the false battery pack. Accordingly, such a method identification of which can be guessed based on an input value and an output value cannot eliminate false battery packs which have mechanisms calculating similarly to the authorized battery pack. There is a problem that false battery packs with low quality cannot be surely eliminated.

Patent Document 1: Japanese Patent No. 3341302

Patent Document 2: Japanese Laid-Open Patent Publication TOKUKAI No. 2000-200222

Patent Document 3: Japanese Laid-Open Patent Publication TOKUHYO No. HEI 9-500520

SUMMARY OF THE INVENTION

The present invention was developed to solve these types of problems. The main object of the present invention is to provide a battery pack, an electrical device connectable to a battery pack, and a method of identifying the type of a battery pack capable of surely identifying the type of a battery including identification whether a battery is authorized or not.

To achieve the above object, a battery pack according to the present invention comprises at least one rechargeable battery 6 having a pair of positive and negative electrodes; a pair of externally exposed charge/discharge terminals 4 connected to the electrodes of the rechargeable battery 6 for supplying power to an electrical equipment unit 1 connected to the battery pack 2; an externally exposed battery pack signal terminal 5 for identifying the type of the battery pack 2; a battery pack communication portion 7 connected to the battery pack signal terminal 5 for receiving an authenticity signal transmitted from the electrical equipment unit 1 through the battery pack signal terminal 5; a random number generating portion 9 for generating a random number based on a predetermined condition; and a battery pack control portion 8 for generating a detection signal based on the authenticity signal received by the battery pack communication portion 7 and the random number generated by the random number generating portion 9, and for transmitting the detection signal from the battery pack communication portion 7 to the electrical equipment unit 1 side through the battery pack signal terminal 5.

In the battery pack according to another aspect of the invention, the random number generating portion 9 is composed of a sequential circuit.

In the battery pack according to still another aspect of the invention, the sequential circuit of the random number generating portion 9 is composed of a counter circuit, and generates a random number by providing a main clock signal of the battery pack control portion 8 to the counter circuit.

In the battery pack according to still another aspect of the invention, the battery pack control portion 8 varies the detection signal transmitted to the electrical equipment unit 1 at every identification process of the type of the battery.

Furthermore, an electrical device according to the present invention can be connected to a battery pack 6 including at least one rechargeable battery 6 having a pair of positive and negative electrodes, a pair of externally exposed charge/discharge terminals 4 connected to the electrodes of the rechargeable battery 6 for supplying power to the electrical device connected to the battery pack 2, and an externally exposed battery pack signal terminal 5 for identifying the type of the battery pack 2. The electrical device comprises a pair of electrical device power terminals 12, an electrical device signal terminal 13 and an electrical device control portion 15. The pair of electrical device power terminals 12 are connected to the pair of charge/discharge terminals 4 of the battery pack 2 for receiving power. The electrical device signal terminal 13 is connected to the battery pack signal terminal 5 for identifying the type of the battery. The electrical device control portion 15 generates an authenticity signal for identifying the type of the connected battery pack 2 and transmits the authenticity signal from the electrical device communication portion 14 to the battery pack 2 through the electrical device signal terminal 13. The electrical device control portion 15 receives a detection signal generated by inputting the authenticity signal and a random number generated based on a predetermined condition in a function by the battery pack 2 and identifies the type of the battery pack 2 based on the detection signal and the authenticity signal.

With a battery pack, an electrical device connectable to a battery pack, and a method of identifying the type of a battery pack according to the present invention, it is possible to surely identify the type of a battery, for example, a false battery pack out of standard or specification, therefore, an electrical equipment unit side can recognize the type of a battery, and the electrical equipment unit can be safely used. Particularly, when random numbers are used in the identification of the type of a battery, it is difficult to manufacture a similar mechanism. This can prevent easy production of false battery packs. Accordingly, the accuracy of identification of authorized battery is improved. As a result, use of substandard battery, which dose not satisfies the conditions, is eliminated, thus, it is possible to ensure safety use of battery pack. Moreover, when a counter circuit is used in the random number generating portion and a main clock generating portion is used for input of the counter circuit, it is possible to ensure high security by using existing component. Therefore, an increase of complexity or cost of conventional battery pack is avoided. An increase of the size of device itself is avoided. Additionally, it is possible to improve reliability and safety of battery pack by detecting a false battery pack with poor quality.

The above and further objects and features of the invention will be more fully apparent from the following detailed description in conjunction with the accompanying drawings.

DETAILED DESCRIPTION OF THE PREFERRED EMBODIMENTS

The following description describes an embodiment of the present invention with reference to the figures. However, the following is intended as specific examples of technical concepts for the present invention, and the battery pack, the electrical device connectable to a battery pack, and the method of identifying the type of a battery pack of the present invention is not limited to the following.

In addition, parts indicated in the claims are in no way limited to the parts represented in the embodiment described in the specification. Unless otherwise specified, any dimensions, materials, shapes and relative arrangements of the parts described in the embodiments are given as an example and not as a limitation. Parts shown in the figures may have features such as size and relative position exaggerated to make the description clear. Parts same as or similar to those of this invention will bear the same designation and numbering throughout the following description. Further, a plurality of structural elements of the present invention may be configured as a single part which serves the purpose of a plurality of elements, on the other hand, a single structural element may be configured as a plurality of parts which serve the purpose of a single element.

Figure 1:
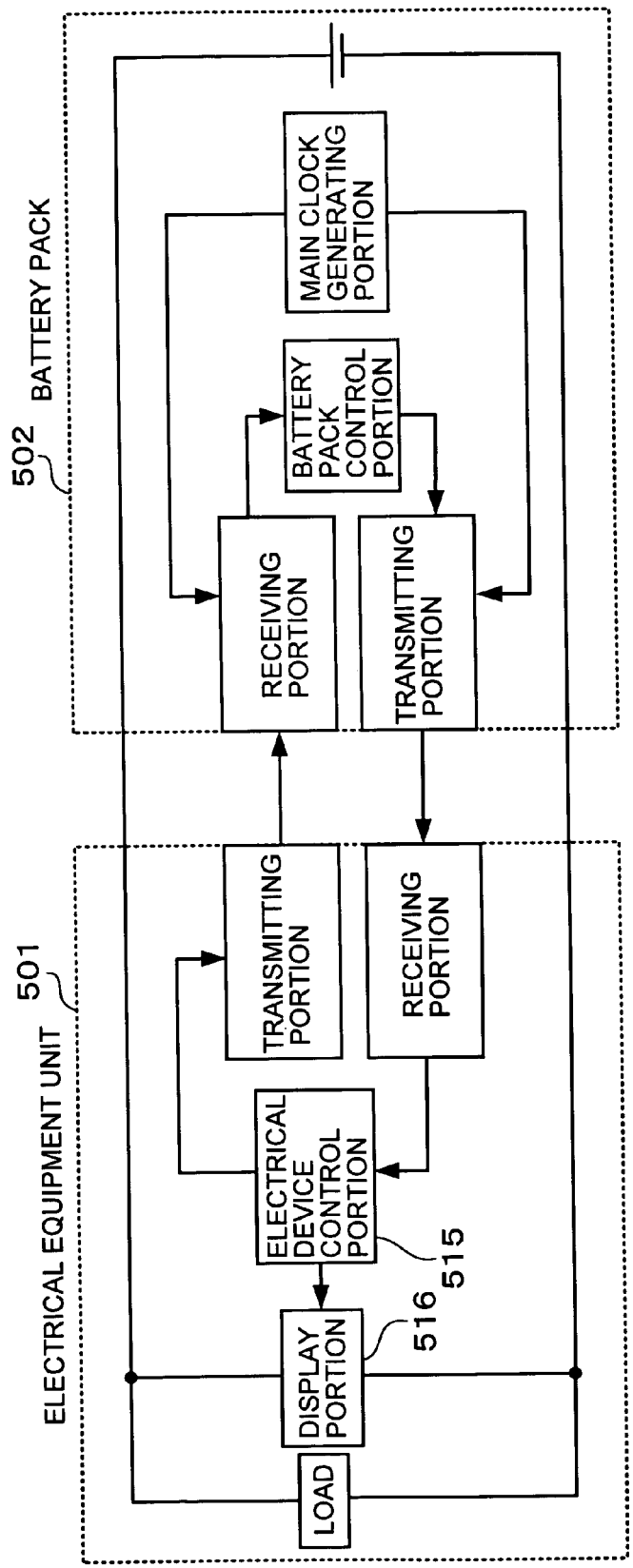
FIG. 1 is a block diagram showing a conventional battery pack and electric device.
Figure 2:
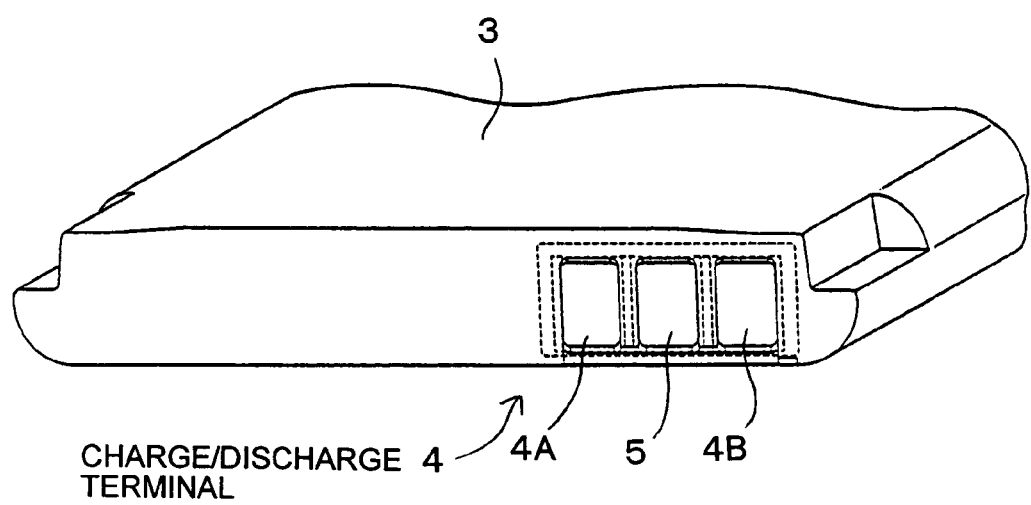
FIG. 2 is a perspective view showing the appearance of a battery pack according to one embodiment of the present invention.

FIG. 2 shows the appearance of a battery pack according to one embodiment of the present invention. With the battery pack 2 shown in this figure, a unit case 3 includes a rechargeable battery, a protection circuit, and so on therein, and a terminal group electrically connected to a circuit group consisting of them is externally exposed on the one end of the unit case 3. The terminal group includes a pair of charge/discharge terminals 4 connected to positive and negative electrodes of the battery, and a battery pack signal terminal 5 for communicating a signal with the battery pack 2 for the purpose of identification of the type of the battery pack 2, or the like. In FIG. 2, a positive power supply terminal 4A, the battery pack signal terminal 5, and a negative power supply terminal 4B are arranged in this order from left to right.

(Battery Pack 2)

Figure 3:
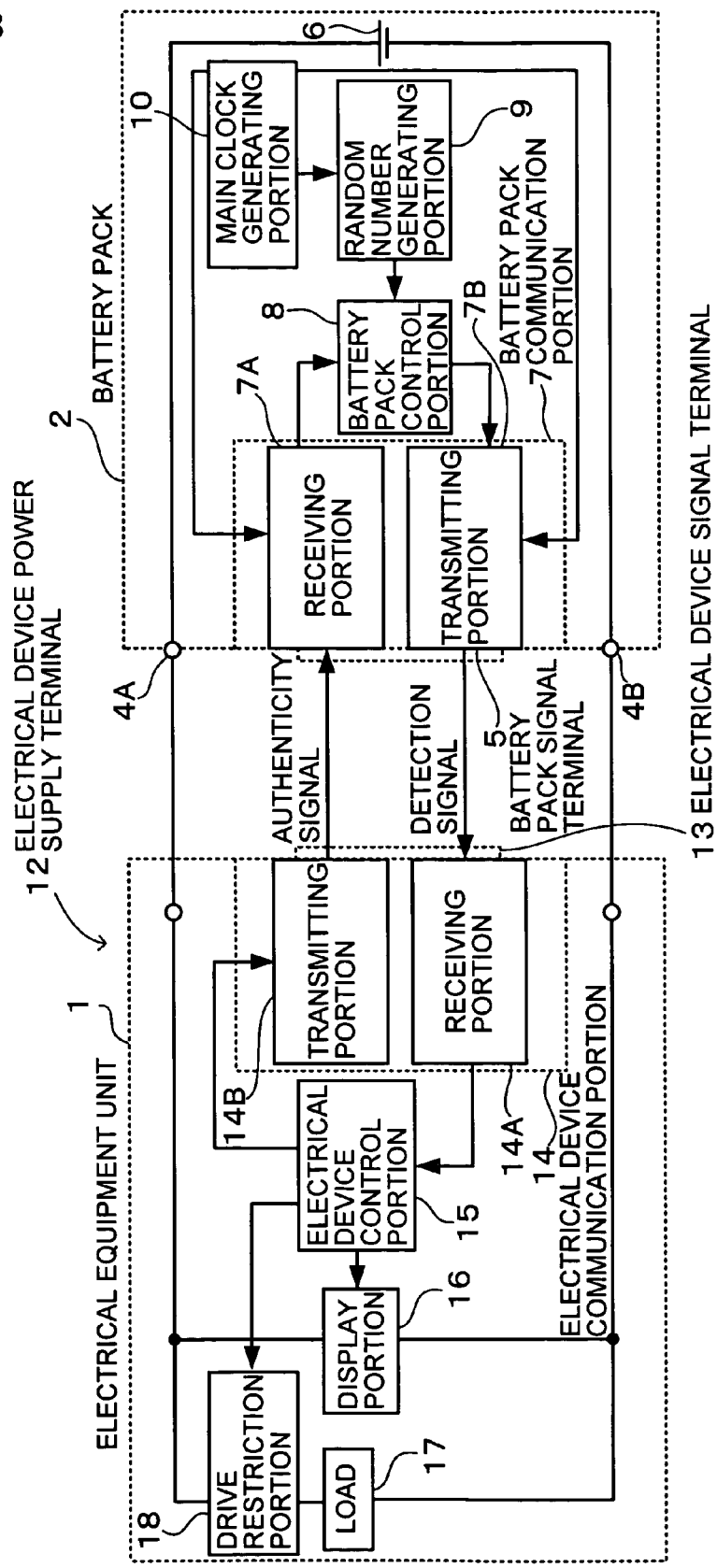
FIG. 3 is a block diagram showing the battery pack and an electric equipment unit according to one embodiment of the present invention.

FIG. 3 shows the battery pack 2 and an electric equipment unit 1 according to this embodiment of the present invention. The battery pack 2 shown in this figure includes a rechargeable battery 6, the charge/discharge terminal 4 connected to the electrodes of the rechargeable battery 6, the battery pack signal terminal 5, a battery pack communication portion 7 connected to the battery pack signal terminal 5, a battery pack control portion 8 connected to the battery pack communication portion 7, a random number generating portion 9 for inputting a random number into the battery pack control portion 8, and a main clock generating portion 10. This battery pack 2 includes the positive power supply terminal 4A and the negative power supply terminal 4B as the charge/discharge terminals 4. Besides, though not illustrated, a circuit for overcharge protection, overdischarge protection, overcurrent protection, or the like may be provided in the battery pack or electrical equipment unit side if necessary.

A nickel-cadmium battery, nickel-hydrogen battery, lithium-ion battery, lithium polymer battery and so on, which can be repeatedly recharged, are applicable to the rechargeable battery 6. Although only one rechargeable battery 6 is shown in FIG. 3, it is needless to say that two or more batteries can be connected in series or in parallel.

The battery pack communication portion 7 is connected to the battery pack control portion 8, and communicates with an electrical device communication portion 14 (later described) through the battery pack signal terminal 5. The battery pack communication portion 7 includes a receiving portion 7A and a transmitting portion 7B. The receiving portion 7A receives an authenticity signal from a transmitting portion 14B of the electrical device communication portion 14, and transmits it to the battery pack control portion 8. The transmitting portion 7B transmits a detection signal generated by the battery pack control portion 8 to a receiving portion 14A of the electrical device communication portion 14.

Although the receiving portion and the transmitting portion are separately configured in each of the battery pack communication portion 7 and the electrical device communication portion 14 (later described) in the example of FIG. 3, they may be integrally configured as a single element of communication portion having transmitting/receiving function. Each of the electrical equipment unit 1 and the battery pack 2 includes one or more signal terminal(s) for identifying the type of the battery pack 2 additionally to the pair of power supply terminals. As shown in FIG. 3, when the receiving portion and the transmitting portion are configured as separated elements, two signal terminals may be provided, but a single integral signal terminal is preferably provided to reduce the number of contacts in terms of cost reduction and reduction of problems such as poor contact.

The battery pack control portion 8 calculates the detection signal obtained by inputting the authenticity signal received by receiving portion 7A and a random number generated by the random number generating portion 9 in a predetermined function, and transmits the detection signal to transmitting portion 7B. The function can be changed according to the type, the number, rating, the model number, or the like of the rechargeable battery 6 installed in the battery pack 2. Accordingly, the value of detection signal is changed, and thus, the electrical equipment unit 1 side can correctly recognize the type of the battery pack 2 connected. In this case, not only the authenticity signal, which is transmitted from the electrical equipment unit 1 to the battery pack 2, but also the random number is provided as the input value of the function. Thus, even when the same value is transmitted from the electrical equipment unit 1 to the battery pack 2 as the authenticity signal, the detection signal, which is returned from the battery pack 2 to the electrical equipment unit 1, is varied depending upon the random number. Accordingly, even if a third party measures the authenticity signal transmitted to the battery pack from the electrical equipment unit, it is difficult to guess how the authenticity signal is generated. Thus, imitation of the battery pack can be difficult. As a result, an authorized battery pack is used; therefore, it is possible to keep quality and to ensure safety.

A random number generator generating random numbers at predetermined timing with a predetermined function or a random number generator generating random numbers by operating from an electrical noise source and so on can be used as the random number generating portion 9. For example, a random number can be a proper value obtained by the predetermined function based on information acquired from a clock, etc. on occasion arises. Specifically, the random number generating portion 9 includes a shift register having a plurality of registers. A predetermined resistor(s) successively provides/provide random numbers. The plurality of registers are connected whereby varying stored data in a predetermined manner and shifts data based on a provided clock. In this case, a sequential circuit is use as the random number generating portion 9. The sequential circuit is a switching circuit including a memory circuit whose output depends not only upon the present state, but also upon what its input conditions have been in the past. Since the output of the sequential circuit depends upon its input hysteresis in the past, the value of the output is varied every time a certain signal is provided. Accordingly, the value can be used as a random number. Pseudo-random numbers can be used as random numbers in the present invention. For example, pseudo-random numbers are generated as follows. A value of necessary digits is taken from the center digit part of the value obtained by a certain initial value. Next, this calculation is performed by inputting the obtained value of necessary digits instead of the initial value. The calculation is repeatedly performed. Thus, the value obtained in each calculation becomes a pseudo-random number. Such a pseudo-random number is included in "a random number" referred in the present invention.

The sequential circuit is composed of a counter circuit, for example. A binary counter or the like, which counts a count value based on a predetermined clock provided from a clock generating portion generating the clock and provides the count value in a binary value of predetermined bits, can be used as the counter circuit. In another example, the sequential circuit is composed of a pseudo-random number generating circuit using shift registers. In this case, an additional element is not required, but the main clock generating portion 10 installed in the battery pack 2 can be used as the clock generating portion for the counter. Generally, an electronic calculator uses a pulse generated at predetermined intervals for timing of synchronization of operation control, or for a timing axis of a transmission system, and thus includes the main clock generating portion 10 generating such a pulse. Such an existing main clock generating portion 10 is used for input of the sequential circuit, thus, it is not necessary to provide an additional source of signal generation for the sequential circuit. Therefore, it is possible to reduce cost, and to simplify circuit design, and to achieve miniaturization.

The main clock generating portion 10 provides a clock signal to the pseudo-random number generating circuit which is the random number generating portion 9. The pseudo-random number generating circuit generates a pseudo-random number series consisting of bit series of predetermined digits as 1 cycle based on the clock signal from the main clock generating portion 10 as shift clock. The random number generating portion 9 is composed of a preset register retaining a predetermined initial value from an initial value storing portion, the shift register, and an exclusive-OR gate calculating exclusive OR of outputs of some digits of shift register. When the initial value transmitted from the initial value storing portion is set to the preset register, the initial value is written in the shift register according to the strobe signal transmitted from a formatter immediately after that. Subsequently, the value stored in the shift register is shifted its digits leftward in synchronization with the clock signal from the main clock generating portion 10, and the output value from the exclusive-OR gate is fed back and stored in LSB (0th digit) of the shift register. Accordingly, a new 1-bit random number is generated every byte in MSB of the shift register, and is provided to the exclusive-OR gate as a pseudo-random number series.

Figure 4:
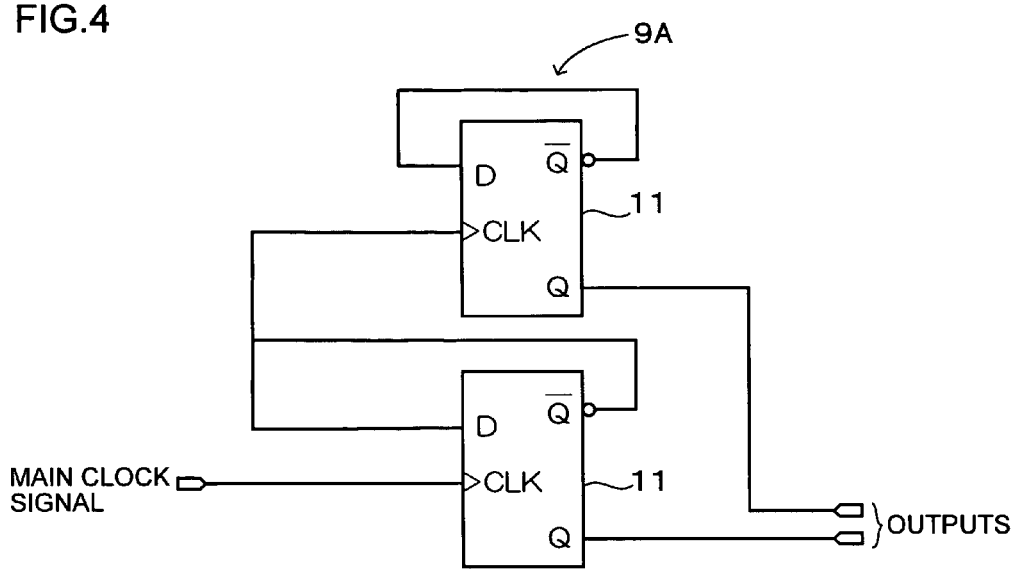
FIG. 4 is a block diagram showing an example of a 2-bit counter circuit as a random number generating portion.

FIG. 4 shows an example of a 2-bit counter circuit 9A. The counter circuit 9A shown in this figure is composed of two D type flip-flops 11. The flip-flop 11 has two stable states, and quickly changes between the states when a trigger is provided. The output is produced in synchronization with the clock received by a clock input. The main clock signal is received as the clock input of one flip-flop 11. D output is received as the clock input of another flip-flop 11. With this construction, a 2-bit output is obtained. The 2-bit output takes on four values from in order of 00, 01, 10, and 11 at timing of every main clock signal.

Figure 5:
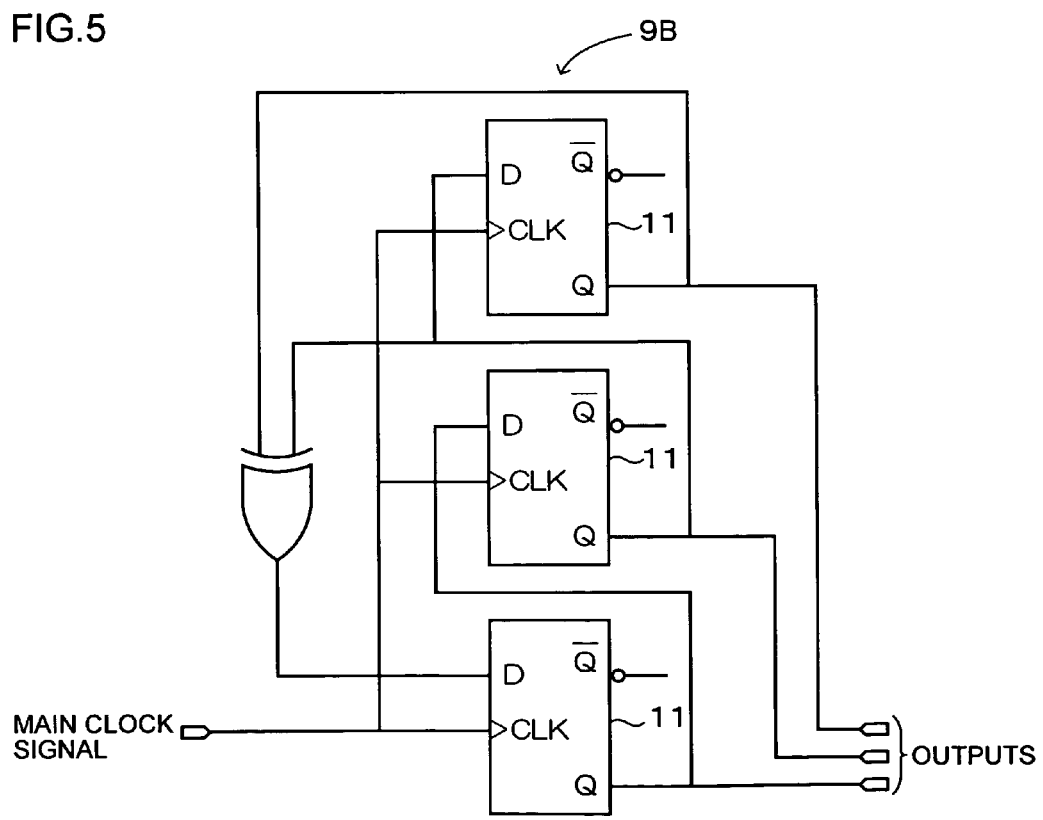
FIG. 5 is a block diagram showing an example of a 3-bit pseudo-random number generating circuit as the random number generating portion.

FIG. 5 shows an example of a 3-bit pseudo-random number generating circuit 9B. The pseudo-random number generating circuit 9B shown in this figure is composed of three D type flip-flops 11. Pseudo-random numbers capable of taking on seven 3-bit values can be provided.

Elements such as these battery pack control portions 8 and the random number generating portion 9 can be composed of hardware such as a certain gate array (FPGA, ASIC), software, or a combination of them. It is not necessary that each of the elements has the same configuration shown in FIG. 3. An element serving substantially the same function, or a single element serving two or more functions of the elements in the construction shown in FIG. 3 is included in the element(s) of the function(s) of the present invention.

In the case where the type of the battery pack 2 is identified by using random numbers, the detection signal returned from the battery pack 2 to the electrical equipment unit 1 is not uniquely determined for the authenticity signal transmitted from the electrical equipment unit 1 to the battery pack 2. Accordingly, interpretation is difficult, and security can be high. That is, since the detection signal is changed for the authenticity signal every time the type of the battery pack 2 is identified, interpretation of calculation algorithm can be difficult. In the case where the value, which is transmitted from the electrical equipment unit to the battery pack, and the value, which is returned, are the same values at every identification, a third party may store one detection signal that should be returned from the battery pack to the electrical equipment unit when manufacturing a false battery pack. In this case, the third party can manufacture a false battery pack, which is identified as an authorized battery pack by returning the value of the stored detection signal. However, the function, in which random numbers are input, is used, thus, the detection signal is seemingly considered at random. Accordingly, the regulation of the identification of an authorized battery is misled, and it is avoided that a false battery with poor quality passes the identification of an authorized battery. As a result, it is possible to improve reliability and safety of battery pack.

On the other hand, the electrical equipment unit 1 side can detect whether the detection signal is a correct value or not. The reason is that the electrical equipment unit 1 side previously has information such as the function or calculation method which is calculated by the battery pack control portion 8, and the range that can take on values as the random numbers. The electrical equipment unit 1 side detects whether a detection signal returned from the battery pack 2 is included in the values that the detection signal can take on in the case of a certain random number, or whether it is included in the values that the detection signal cannot take on in the cases of any random numbers. Therefore, this detection can identify the type of the battery pack.

This identification of the type of the battery pack is made when the battery pack is connected. However, the identification is not specifically limited to once in the connection. The identification may be made three times in the connection. In addition, the identification may be made in communication at regular time intervals while the battery pack is used. In the case where an identification is made two or more times, the type of the battery pack is more surely identified. Even if a false battery pack returns a correct detection signal by chance, when an incorrect signal is detected at least one time in the two or more times, the battery pack is not identified as an authorized battery pack. Thus, a false battery pack can be surely detected.

In the present invention, identification or detection of the battery includes identification of the type of a connected battery pack, and identification whether a connected battery pack is an authorized battery pack or not.

(Electrical Equipment Unit 1)

An electrical equipment unit 1 comprises a pair of electrical device power terminals 12 connected to the charge/discharge terminals 4 of the battery pack 2 for receiving power; an electrical device signal terminal 13 connected to the battery pack signal terminal 5 for identifying the type of the battery; an electrical device communication portion 14 for communicating with the battery pack 2 through the electrical device signal terminal 13; an electrical device control portion 15 which generates an authenticity signal for identifying the type of the connected battery pack 2 and transmits the authenticity signal from the electrical device communication portion 14 to the battery pack 2 through the electrical device signal terminal 13, and receives a detection signal generated by the battery pack 2 and identifies the type of the battery pack 2 based on the detection signal and the authenticity signal; and a display portion 16 for displaying the result detected by the electrical device control portion 15.

A charger for charging the battery pack 2 or a portable electronic device such as a portable telephone (cell-phone), PDA, and a handy terminal can be used as the electrical equipment unit 1. The electrical equipment unit 1 and the battery pack 2 are configured in the shapes connectable to each other. When the electrical equipment unit 1 and the battery pack 2 are connected to each other, the power supply terminal of the electrical device and the charge/discharge terminal 4 of the battery pack 2 are electrically connected. Thus, the electrical equipment unit 1 receives power supply from the battery pack 2. In the case that the electrical equipment unit 1 is a charger, the electrical equipment unit 1 charges the battery pack 2.

The electrical device communication portion 14 is connected to the electrical device control portion 15, and communicates with the electrical pack 2 through the electrical device signal terminal 13. The electrical device communication portion 14 also includes the receiving portion 14A and the transmitting portion 14B. The transmitting portion 14B transmits the authenticity signal generated by the electrical device control portion 15 to the receiving portion 7A of the battery pack 2 side. The receiving portion 14A receives the detection signal calculated by the battery pack control portion 8, and transmits it to the electrical device communication portion 14.

The electrical device control portion 15 generates the authenticity signal, and compares the received detection signal with the authenticity signal, and thus identifies the type of the battery pack 2. The authenticity signal serves as a trigger, which requires the battery pack 2 side to identify the type battery pack 2, and can be an arbitrary signal. The electrical device control portion 15 detects whether the relation between the detection signal and the authenticity signal is correct. The detection is made based on whether the detection signal is included in the values which the detection signal can take on, as mentioned above. When the detection signal is correct, the type of the battery pack 2 may be additionally identified. In the case that the function calculated by the battery pack control portion 8 is changed according to the type of the battery pack 2, the type of the battery can be specified based on the detection signal.

The display portion 16 can display the result of detection. A liquid crystal display can be located on the electrical equipment unit 1 as the display portion 16. For example, a message such as "A suitable battery pack XXX is connected" is displayed for a user to be notified. A user may not be notified that identification of the type of the battery pack is made.

When a battery pack is not an authorized article, the display portion 16 displays a message such as "This battery pack may not be an authorized article. Continuous use of this battery pack may cause abnormalities." In this case, operation of the battery pack may be restricted. For example, restriction is made as follows. Available time for use of the battery pack is set to a half the normal time. The maximum current is set to 80% of rated value. Particular functions are not available. Power supply for a load 17 is interrupted by changing a switch of a power line of the electrical equipment unit 1 side into an interruption state. These restrictions are made by controlling a drive restriction portion 18 by means of the electrical device control portion 15. A power MOSFET for current control can be used as the drive restriction portion 18. Accordingly, a battery pack, which is not an authorized article, is restricted to be used, thus, an accident caused by a substandard battery pack can be prevented. Therefore, safety is improved, and a user can be protected. In addition, it is expected that urging users to use authorized articles furthers sales of authorized battery packs.

The foregoing battery pack and electrical equipment unit identify the type of the battery as follows.

(1) The electrical equipment unit 1 generates the authenticity signal by means of the electrical device control portion 15, and transmits it from the transmitting portion 14B of the electrical equipment unit 1 to the battery pack 2.

(2) The battery pack 2 receives the authenticity signal transmitted from the electrical equipment unit 1 by means of the receiving portion 7A of the battery pack 2.

(3) The battery pack control portion 8 calculates the value of a function obtained by inputting a random number generated by the random number generating portion 9 in the function.

(4) The above value of a function is transmitted as the detection signal from the transmitting portion 7B of the battery pack 2 to the electrical equipment unit 1.

(5) The electrical equipment unit 1 receives the detection signal transmitted from the battery pack 2 by means of the receiving portion 14A of the electrical equipment unit 1.

(6) The electrical equipment unit 1 detects whether the relation between the originally transmitted authenticity signal and the detection signal received from the battery pack 2 is correct by means of the electrical device control portion 15.

(7) The display portion 16 displays the result of detection.

A battery pack, an electrical device connectable to a battery pack, and a method of identifying the type of the battery pack can be applied to a portable telephone (cell-phone), a charger, and a battery pack of a media reproduction device such as an MD player.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on applications No. 2003-321149 filed in Japan on Sep. 12, 2003, the content of which is incorporated hereinto by reference.

What is claimed is:

1. A battery pack comprising:
    at least one rechargeable battery having a pair of positive and negative electrodes;
    a pair of externally exposed charge/discharge terminals connected to the electrodes of the rechargeable battery for supplying power to an electrical equipment unit connected to the battery pack;
    an externally exposed battery pack signal terminal for identifying the type of the battery pack;
    a battery pack communication portion connected to the battery pack signal terminal for receiving an authenticity signal transmitted from the electrical equipment unit through the battery pack signal terminal;
    a random number generating portion for generating a random number based on a predetermined condition; and
    a battery pack control portion for generating a detection signal from the authenticity signal received by the battery pack communication portion and the random number generated by the random number generating portion, and for transmitting the detection signal from the battery pack communication portion to the electrical equipment unit side through the battery pack signal terminal, wherein the detection signal generated by the battery pack control portion is a random signal generated from the authenticity signal and the random number generated by the random number generating portion.

2. The battery pack according to claim 1, wherein the random number generating portion is a pseudo-random number generating circuit.

3. The battery pack according to claim 2, wherein the random number generating portion includes a shift register having a plurality of registers, which are connected whereby varying stored data in a predetermined manner and shifts data based on a provided clock, wherein a predetermined resistor successively provides random numbers.

4. The battery pack according to claim 3, wherein the random number generating portion includes a preset register retaining a predetermined initial value from an initial value storing portion, the shift register, and an exclusive-OR gate calculating exclusive OR of outputs of some digits of the shift register.

5. The battery pack according to claim 1, wherein the random number generating portion is composed of a sequential circuit.

6. The battery pack according to claim 5, wherein the sequential circuit of the random number generating portion is composed of a counter circuit, and generates a random number by providing a main clock signal of the battery pack control portion to the counter circuit.

7. The battery pack according to claim 6, wherein the counter circuit is composed of a plurality of flip-flops.

8. The battery pack according to claim 6, wherein the counter circuit is a binary counter.

9. The battery pack according to claim 1, wherein the battery pack control portion varies the detection signal transmitted to the electrical equipment unit at every identification process of the type of the battery.

10. The battery pack according to claim 1, wherein the battery pack communication portion includes a receiving portion and a transmitting portion, wherein the receiving portion receives the authenticity signal from the electrical equipment unit, and transmits it to the battery pack control portion, and the transmitting portion transmits the detection signal generated by the battery pack control portion to the electrical equipment unit.

11. The battery pack according to claim 10, wherein the battery pack signal terminal is commonly used for connecting the receiving portion and the transmitting portion of the battery pack communication portion to the electrical equipment unit.

12. The battery pack according to claim 1, wherein the rechargeable battery is any of nickel-cadmium battery, nickel-hydrogen battery, lithium-ion battery, and lithium polymer battery.

13. The battery pack according to claim 1, wherein if the same value of the authenticity signal is transmitted from the electrical equipment unit to the battery pack, the detection signal returned from the battery pack to the electrical equipment unit is varied depending upon the random number.

14. The battery pack according to claim 13, wherein a calculation method or function used by the battery pack control portion and a range of the random numbers are set, and thus the detection signal value that can be taken is predetermined depending upon the random number.

* * * * *